(12) United States Patent
Xie et al.

(10) Patent No.: US 7,599,389 B2
(45) Date of Patent: Oct. 6, 2009

(54) DSL SUBSCRIBER BOARD WITH INCREASABLE BANDWIDTH AND METHOD FOR INCREASING BANDWIDTH OF A DSL SUBSCRIBER BOARD

(75) Inventors: Weiping Xie, Guangdong (CN); Qiupeng Zhao, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 495 days.

(21) Appl. No.: 11/526,389

(22) Filed: Sep. 25, 2006

(65) Prior Publication Data

US 2007/0061422 A1    Mar. 15, 2007

Related U.S. Application Data

(63) Continuation of application No. PCT/CN2006/000967, filed on May 15, 2006.

(30) Foreign Application Priority Data

May 17, 2005   (CN)   .................. 2005 1 0070613

(51) Int. Cl.
   *H04L 12/66*   (2006.01)
(52) U.S. Cl. .................. 370/463; 370/419; 370/395.6; 370/235
(58) Field of Classification Search ................. 370/474, 370/395.6, 395.5, 232, 419, 463, 395.1
   See application file for complete search history.

(56) References Cited

U.S. PATENT DOCUMENTS 6,084,881 A * 7/2000 Fosmark et al. ............. 370/397
6,147,997 A * 11/2000 Holden et al. ............ 370/395.1

(Continued)

FOREIGN PATENT DOCUMENTS

CN    2 687 967 Y    3/2005

(Continued)

OTHER PUBLICATIONS

Wu Haocheng et al, "The Design and Realization of Multiplexing and Switching Based on ATM", Guilin Institute of Optical Communications, Guilin 541004, Optical Communication Technology, vol. 25, No. 3, 1994-2007 China Academic Journal Electronic Publishing House.

*Primary Examiner*—Ricky Ngo
*Assistant Examiner*—Dewanda Samuel
(74) *Attorney, Agent, or Firm*—Conley Rose, P.C.; Grant Rodolph

(57) ABSTRACT

The present invention discloses a DSL subscriber board with an increasable bandwidth and a method for increasing bandwidth of a DSL subscriber board; the bandwidth of interfaces between chips of the DSL subscriber board can be increased to a predefined bandwidth according to a required amount. The method specifically includes: increasing the number of the interface; increasing the bandwidth rate of the interface; or increasing the clock frequency of the interface. Both the DSL subscriber board and the method for increasing the bandwidth of the DSL subscriber board can increase the processing bandwidth of the DSL subscriber board efficiently, and thereby increasing the number of subscribers of the DSL subscriber board and reducing cost efficiently. At the same time, it can also improve the bandwidth of the DSL subscribers to accommodate to the development of future DSL high bandwidth technologies.

14 Claims, 3 Drawing Sheets

U.S. PATENT DOCUMENTS

| | | |
|---|---|---|
| 6,343,077 B1 * | 1/2002 | Chin et al. .............. 370/395.6 |
| 6,668,297 B1 * | 12/2003 | Karr et al. .................. 710/305 |
| 6,718,419 B1 * | 4/2004 | Delvaux ..................... 710/305 |
| 6,751,233 B1 * | 6/2004 | Hann ......................... 370/466 |
| 6,826,187 B1 * | 11/2004 | Hey et al. ................ 370/395.6 |
| 6,850,526 B2 * | 2/2005 | Tan et al. ................. 370/395.6 |
| 6,977,922 B2 * | 12/2005 | Blanset et al. ............. 370/352 |
| 2002/0009089 A1 | 1/2002 | McWilliams |
| 2003/0043849 A1 | 3/2003 | Suwa |
| 2004/0228346 A1 * | 11/2004 | Parruck et al. ........... 370/395.1 |
| 2006/0045123 A1 * | 3/2006 | Gopalan ..................... 370/465 |

FOREIGN PATENT DOCUMENTS

| | | |
|---|---|---|
| CN | 1595926 A | 3/2005 |
| CN | 2687967 Y | 3/2005 |
| CN | 1 866 838 A | 11/2006 |
| EP | 1 667 365 A1 | 6/2006 |
| KR | 2002-0084355 | 11/2002 |
| WO | WO 03/096620 A1 | 11/2003 |

\* cited by examiner

DSL SUBSCRIBER BOARD WITH INCREASABLE BANDWIDTH AND METHOD FOR INCREASING BANDWIDTH OF A DSL SUBSCRIBER BOARD

CROSS-REFERENCE TO RELATED APPLICATIONS

This application is a continuation application of International Application No. PCT/CN2006/000967, filed May 15, 2006, which claims priority in Chinese Application No. 2005-10070613.3, filed May 17, 2005, both of which are entitled "DSL Subscriber Board with Increasable Bandwidth and Method for Increasing Bandwidth of a DSL Subscriber Board". The full disclosure of these applications are hereby incorporated by reference.

FIELD OF THE TECHNOLOGY

The present invention relates to Digital Subscriber Line (DSL) technologies, more particularly to a DSL subscriber board with an increasable bandwidth and a method for increasing bandwidth of a DSL subscriber board.

BACKGROUND OF THE INVENTION

At present, DSL technologies have been widely applied, and requirements on the DSL subscriber board also rise continuously. Port density of a subscriber board is increasing from 8, 16, 32 to 64, or even higher, and DSL line bandwidth is increasing from 512 k, 2 M, 8 M, 24 M to as high as 100 M. To accord with the above developing trend, processing bandwidth of the DSL subscriber board must be increased quickly.

A structure of most DSL subscriber boards is shown in FIG. 1. There is only one interface (interface 1) between a DSL physical interface chip and a protocol processing chip. Generally, the interface 1 can be a Universal Test and Operations PHY Interface for ATM (UTOPIA) Level 1 (a first class of interface), or a UTOPIA Level 2 (a second class of interface), or a Packet over SONET/SDH (POS) Level 1 interface or a POS Level 2 interface. And there is only one uplink interface (interface 2) between the protocol processing chip and an uplink physical interface chip. The form of the interface 2 is not limited. Generally, it can be a Gigabyte Ethernet (GE) interface, a Fast Ethernet (FE) interface or a Low Voltage Difference Synchronization (LVDS) interface. Alternatively, the interface 2 can also be implemented by two interfaces which operate as work/backup interfaces, and only one of the two interfaces works at the same time.

Therefore, a method for increasing the bandwidth of a DSL subscriber board is required.

SUMMARY OF THE INVENTION

The present invention provides a Digital Subscriber Line (DSL) subscriber board with an increasable bandwidth and a method for increasing bandwidth of a DSL subscriber board, so as to increase the processing bandwidth of the DSL subscriber board efficiently.

The present invention is implemented by the following technical solutions:

A DSL subscriber board with an increasable bandwidth includes:

a DSL physical interface chip, a protocol processing chip and an uplink physical interface chip, the DSL physical interface chip is connected with the protocol processing chip through a first interface, the protocol processing chip is connected with the uplink physical interface chip through a second interface, wherein, the bandwidth of at least one of the first interface and the second interface is configured to a pre-defined bandwidth.

The present invention also discloses a method for increasing bandwidth of a DSL subscriber board, wherein, the DSL subscriber board includes a DSL physical interface chip, a protocol processing chip and an uplink physical interface chip, and a first interface between the DSL physical interface chip and the protocol processing chip, a second interface between the protocol processing chip and the uplink physical interface chip; the method includes: increasing the bandwidth of the first interface and/or the second interface to a pre-defined bandwidth according to the required amount when needed.

As can be seen from the above, the present invention efficiently improves the bandwidth of the DSL subscriber board by increasing the bandwidths of the interfaces between chips; the improvement of the bandwidth of the DSL subscriber board can not only increase the subscriber bandwidth and the subscriber density so as to meet the demands on bandwidth of future higher bandwidth services, but also reduce cost efficiently.

DETAILED DESCRIPTION OF THE INVENTION

Figure 1:
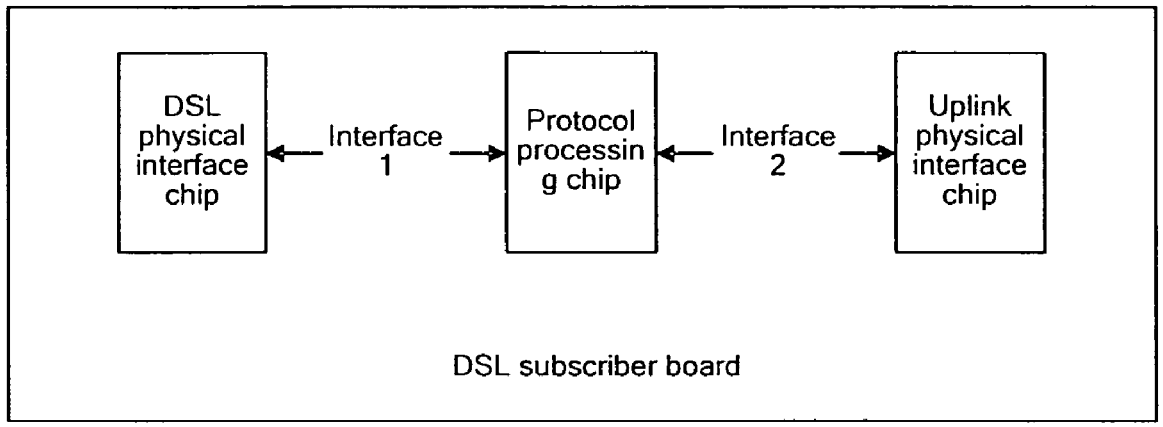
FIG. 1 is a schematic diagram illustrating a structure of a DSL subscriber board according to the related art.

As shown in FIG. 1, it is not difficult to see that the bandwidth of the interface 1 of the DSL subscriber board adopting the existing technology is limited, which limits subscriber bandwidth and subscriber density of the subscriber board and is not favourable for reducing cost and developing new services with higher bandwidth demands. At the same time, only one interface 2 in a work state is adopted, which results in a limited bandwidth of an uplink interface of the DSL subscriber board, and also limits the increase of the subscriber bandwidth. Although the two work/backup interfaces are adopted, only one of them transmits traffics when working. Therefore, it does not have any improvement to the bandwidth of the interface but only a backup and protection. Accordingly, the subscriber density and the subscriber bandwidth are still not increased.

Since the bandwidth of a subscriber board is directly affected by the bandwidths of interfaces between the chips in the DSL subscriber board, the embodiments of the present invention increase the bandwidth of the DSL subscriber board by increasing the bandwidths of the interfaces between the chips in the DSL subscriber board, which increases the number of subscribers of a DSL subscriber board, thereby efficiently reducing the cost. At the same time, the increase of the bandwidth may also provide more bandwidth for DSL subscribers, so as to accommodate to the development of future DSL higher bandwidth technologies.

A DSL subscriber board includes an interface between a DSL physical interface chip and a protocol processing chip, and an interface between the protocol processing chip and an uplink physical interface chip. Therefore, the bandwidth of one of the two interfaces or both two interfaces are increased according to practical requirements in the embodiments of the present invention.

There are many means to increase the bandwidth of an interface, e.g., increase the number of interface, increase the bandwidth rate of the interface, or increase the clock frequency of the interface.

In order to make the method of the present invention more understandable, the method will be described in detail hereinafter with the accompanying drawings.

There are mainly three solutions to increase the bandwidth of the interface (interface 1) between the DSL physical interface chip and the protocol processing chip, i.e., increase the number of the interface 1; increase the bandwidth rate of the interface 1; and increase the clock frequency of the interface 1, which will be described in detail hereinafter with the accompanying drawings, respectively.

Solution I: increase the number of the interface 1.

The specific operation generally is to directly multiple the number of the interface 1 (UTOPIA or POS) to two or more.

Figure 2:
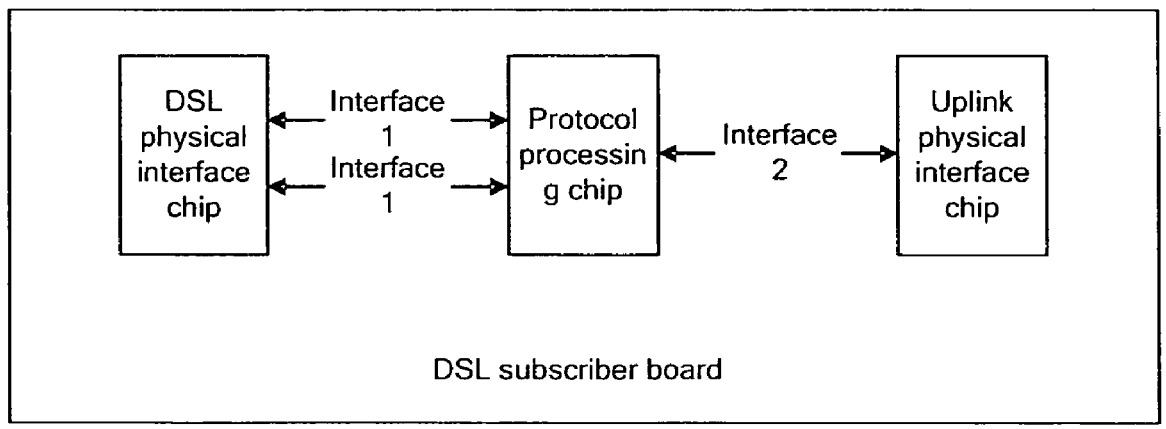
FIG. 2 is a schematic diagram illustrating a structure of a DSL subscriber board according to a first embodiment of the present invention.

As shown in FIG. 2, the number of the DSL physical interface chip and that of the protocol processing chip can remain unchanged, i.e., both of them are one.

The number of the DSL physical interface chip is not limited to one and the specific number is determined according to the subscriber density. For example, the higher the subscriber density is, the larger the number of the DSL physical interface chip is.

Furthermore, the number of the protocol processing chip is also not limited to one, but in general, it does not exceed the number of the interface 1. And, all the protocol processing chips must implement the same function, i.e., there may be multiple protocol processing chips physically, but they should be one chip logically. Thus, not only the bandwidth of the interface 1 can be increased, but also the performance of protocol processing is improved.

Figure 3:
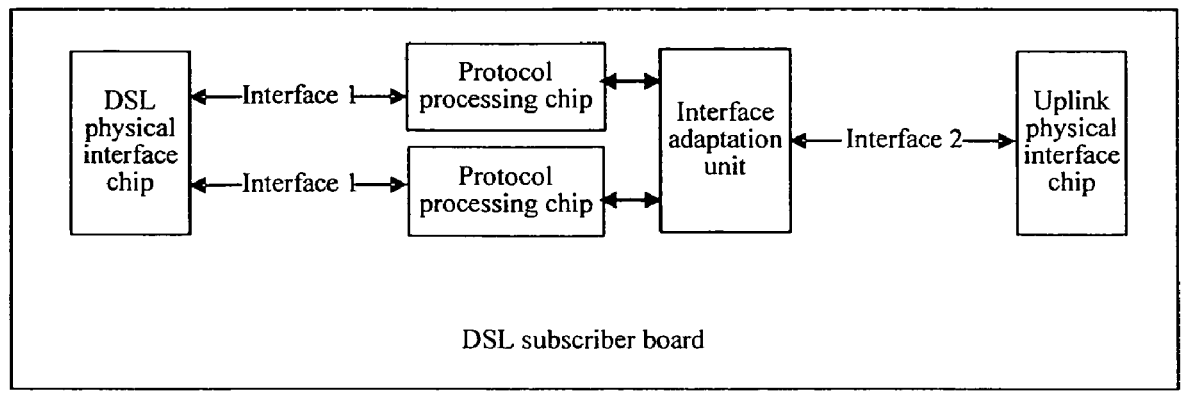
FIG. 3 is a schematic diagram illustrating a structure of a DSL subscriber board according to a second embodiment of the present invention.

When the number of the protocol processing chip exceeds one and number of the interface 2 between the protocol processing chip and the uplink physical interface chip is only one, an interface adaptation process on communication contents between the protocol processing chip and the interface 2 is needed generally, so as to implement a bi-directional transmission of the communication contents between the protocol processing chip and interface 2. As shown in FIG. 3, the interface adaptation process is implemented by an interface adaptation unit connected between the protocol processing chip and the uplink physical interface chip.

When the number of the protocol processing chip is the same as that of the interface 1, not only the bandwidth of the interface 1 can be multiplied, but also the protocol processing performance of the protocol processing chip can be improved at the same time.

Solution II: increase the bandwidth rate of the interface 1.

The specific operation generally is to replace the interface 1 by an interface with a higher rate.

For example, replace the interface 1 by a UTOPIA Level 3 or a POS Level 3 interface. Thus, the bandwidth of a single line can achieve 2.5 G that is equivalent to three lines of a UTOPIA Level 2 or a POS Level 2 interface.

In the present solution, the interface 1, the DSL physical interface chip and the protocol processing chip can all be one in number. The present solution can also be performed based on Solution I, i.e., the interface 1, the DSL physical interface chip and the protocol processing chip are not limited to one in number, and all of the interfaces 1 or parts of the interfaces 1 can be replaced by interfaces with higher rate on practical demands.

Solution III: increase the clock frequency of the interface 1.

The specific operation generally is to improve the work frequency of the interface 1 to be higher than a standard frequency of an interface, so as to increase the bandwidth of the interface 1.

For example, the standard frequency of the UTOPIA Level 2 is 50 MHz, and the frequency can be increased to 52 MHz or 60 MHz or even higher by replacing a crystal oscillator, so as to increase the bandwidth of the interface 1 efficiently.

In the present solution, the interface 1, the DSL physical interface chip and the protocol processing chip can all be one in number. The present solution can also be performed based on Solution I and Solution II, i.e., all of the interface 1, the DSL physical interface chip and the protocol processing chip are not limited to one in number, and the interface 1 can be an interface with a higher rate. Furthermore, the clock frequencies of all of the interfaces 1 or parts of the interfaces 1 can be increased on practical demands.

In addition, there are mainly two solutions to increase the bandwidth of the uplink interface (interface 2) between the protocol processing chip and the uplink physical interface chip, i.e., increase the number of the interface 2; increase the bandwidth rate of the interface 2. The solutions will be described in detail hereinafter with the accompanying drawings respectively.

Solution 1: increase the number of the interface 2.

the specific operation generally is: directly multiple the interface 2 to two or more, the specific process is the same as that of the interface 1.

Figure 4:
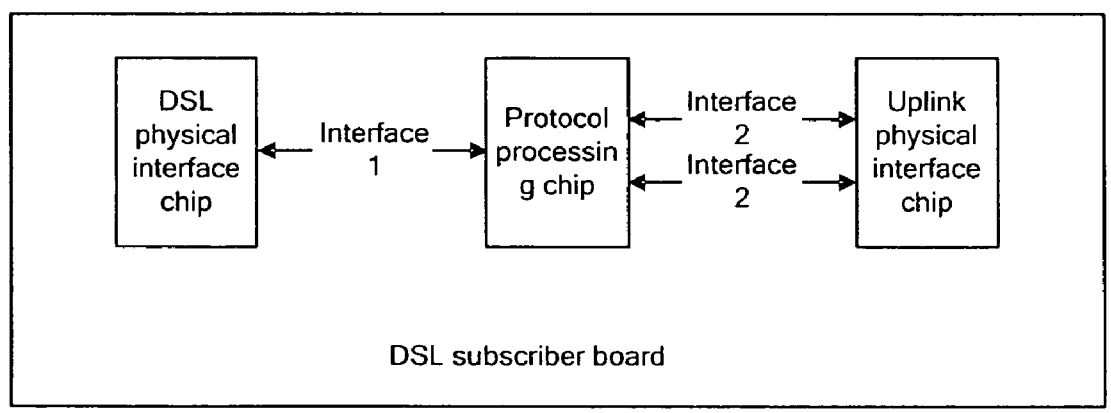
FIG. 4 is a schematic diagram illustrating a structure of a DSL subscriber board according to a third embodiment of the present invention.

As shown in FIG. 4, the number of the protocol processing chip and number of the uplink physical interface chip can remain unchanged, and each of them can be one in the present solution.

The protocol processing chip and the uplink physical interface chip are not limited to one in number, the number of one of the two chips can be multiple, or the numbers of both the two chips are multiple. And, the protocol processing chips must implement the same function, i.e., the protocol processing chips should be one chip logically although they are multiple chips physically. Thus, not only the bandwidth of the interface 2 can be increased, but also the protocol processing performance of the protocol processing chip is improved at the same time.

Solution 2: improve the bandwidth rate of the interface 2.

the specific operation generally is: replace the interface 2 with an interface with a higher rate.

For example, replace the interface 2 with a 10 GE, a UTOPIA Level 3, a POS Level 3 interface or a 3.125 G high data rate serial bus interface, so as to increase the bandwidth of the interface 2 efficiently.

In the present solution, the interface 2, the protocol processing chip and the uplink physical interface chip can all be one in number; The present solution can also be performed based on Solution 1, i.e., the interface 2, the protocol processing chip and the uplink physical interface chip are not limited to one in number, and all of the interfaces 2 or parts of the interfaces 2 can be replaced by interfaces with higher rates on demands.

In general, the method of extending an interface to two lines can meet service and subscriber demands for bandwidth at present. But the method of adopting three or more lines of interfaces, or replacing the interface with an interface with higher rate may be needed to increase the bandwidth of the DSL subscriber board with the development of future higher bandwidth services.

Figure 5:
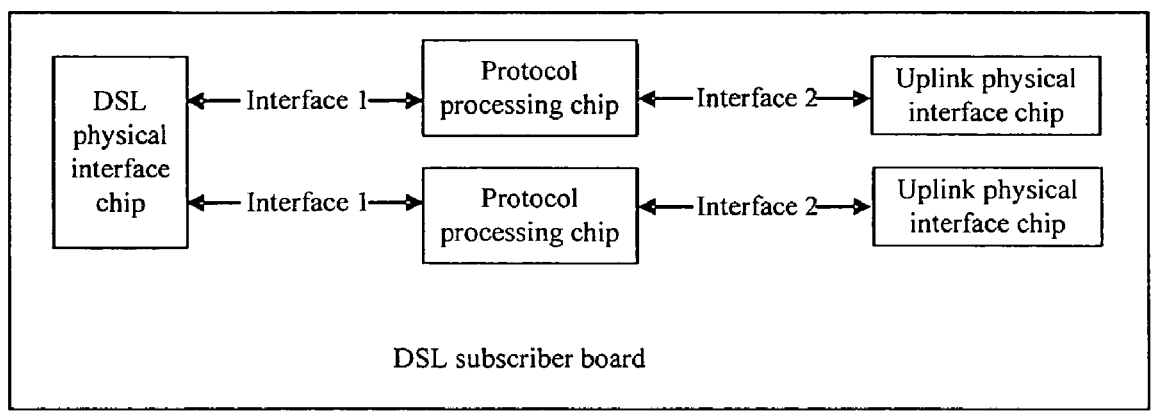
FIG. 5 is a schematic diagram illustrating a structure of a DSL subscriber board according to a fourth embodiment of the present invention.

The above solutions for increasing the bandwidth of the interface 1 and the interface 2 can be used separately, or be combined. And which solution is adopted should be determined according to an amount of the bandwidth needs to be increased, that is, according to the number of subscribers and/or the subscriber's demands for bandwidth. For example, as shown in FIG. 5, the number of the interface 1 and the interface 2 can be increased at the same time; or the clock frequency of the interface 1 can be increased when replacing the interface 2 by an interface with a higher rate.

The present invention also discloses a DSL subscriber board capable of implementing the above method for increasing the bandwidth, which includes a DSL physical interface chip, a protocol processing chip and an uplink physical interface chip. Wherein, the DSL physical interface chip is connected with the protocol processing chip through an interface 1, the protocol processing chip protocol processing chip is connected with the uplink physical interface chip through an interface 2, the interface 1 and/or the interface 2 include at least one interface respectively, and not both the interface 1 and the interface 2 include only one interface.

Specifically, when the interface 1 includes one interface, the interface 2 can include two or more interfaces; when the interface 1 includes two or more interfaces, the interface 2 can include one, two or more interfaces.

When the number of the protocol processing chip exceeds that of the interface 2, and the protocol processing chips have the same function, the DSL subscriber board can further include an interface adaptation unit, which is connected between the protocol processing chips and the interface 2, used for performing an interface adaptation process on communication contents between the protocol processing chips and the interface 2 to enable a bi-directional transmission of the communication contents between the protocol processing chips and the interface 2.

To make the names of the elements more normative, the interface 1 can be referred to as a first interface and the interface 2 can be referred to as a second interface.

As can be seen from the above, both the DSL subscriber board and the method for increasing bandwidth of a DSL subscriber board in accordance with the present invention can increase the processing bandwidth of the DSL subscriber board efficiently.

The above-mentioned embodiments are only the preferred embodiments of the present invention, which are not used to confine the protection scope of the present invention. Various changes in form and in detail made without departing from the spirit and scope of the invention as defined by the appended claims are all covered in the protection scope of the present invention.

What is claimed is:

1. A Digital Subscriber Line (DSL) subscriber board with an increasable bandwidth, comprising:
 a DSL physical interface chip;
 at least one protocol processing chip;
 an uplink physical interface chip; wherein,
 the DSL physical interface chip is connected with the protocol processing chip through a first interface, the at least one protocol processing chip is connected with the uplink physical interface chip; and
 the DSL subscriber board further comprises:
 a plurality of first interfaces, working at the same time and adapted to connect the DSL physical interface chip with the at least one protocol processing chip; and
 a plurality of second interfaces, working at the same time and adapted to connect the uplink physical interface with the at least one protocol processing chip;
 the first interfaces are Universal Test and Operations PHY Interfaces for ATM (UTOPIA) interfaces or Packet over SONET/SDH (POS) interfaces; and
 the second interfaces are Gigabyte Ethernet interfaces, or Fast Ethernet interfaces or Low Voltage Difference Synchronization interfaces, or 10 Gigabyte Ethernet interfaces or 3.125 G high data rate serial bus interfaces.

2. The DSL subscriber board according to claim 1, wherein at least one of the first interfaces and/or the second interfaces is configured with an increased bandwidth rate.

3. The DSL subscriber board according to claim 1, wherein at least one of the first interfaces and/or the second interfaces is configured with an increased clock frequency.

4. The DSL subscriber board according to claim 1, wherein the number of the protocol processing chip exceeds the number of the second interfaces;
 the DSL subscriber board further comprises an interface adaptation unit connected between the protocol processing chips and the second interfaces, configured to support a bi-directional transmission of communication contents between the protocol processing chips and the second interfaces.

5. The DSL subscriber board according to claim 1, wherein the number of the protocol processing chip exceeds the number of the second interfaces;
 the DSL subscriber board further comprises an interface adaptation unit connected between the protocol processing chips and the second interfaces, configured to support a bi-directional transmission of communication contents between the protocol processing chips and the second interfaces.

6. The DSL subscriber board according to claim 1, wherein the number of the protocol processing chip exceeds the number of the second interfaces;
 the DSL subscriber board further comprises an interface adaptation unit connected between the protocol processing chips and the second interfaces, configured to support a bi-directional transmission of communication contents between the protocol processing chips and the second interfaces.

7. A method for increasing bandwidth of a Digital Subscriber Line (DSL) subscriber board, which comprises: a DSL physical interface chip, at least one protocol processing chip and an uplink physical interface chip, comprising: increasing bandwidth of DSL subscriber board by connecting the DSL physical interface board with the at least one protocol processing chip by a plurality of first interfaces which work at the same time; and/or connecting the at least one protocol processing chip with the uplink physical interface chip by a plurality of second interfaces which work at the same time; wherein
 the first interfaces are Universal Test and Operations PHY Interfaces for ATM (UTOPIA) interfaces or Packet over SONET/SDH (POS) interfaces; and
 the second interfaces are Gigabyte Ethernet interfaces, or Fast Ethernet interfaces or Low Voltage Difference Synchronization interfaces, or 10 Gigabyte Ethernet interfaces or 3.125 G high data rate serial bus interfaces.

8. The method according to claim 7, wherein the number of the DSL physical interface chip, the protocol processing chip or the uplink physical interface chip is at least one.

9. The method according to claim 8, further comprising:
when the number of the protocol processing chips exceeds the number of the second interfaces, performing an interface adaptation process on communication contents between the protocol processing chips and the second interface.

10. A Digital Subscriber Line (DSL) subscriber board with an increasable bandwidth, comprising:
a DSL physical interface chip;
at least two protocol processing chips;
an uplink physical interface chip;
an interface adaptation unit; wherein,
the DSL physical interface chip is connected with the at least two protocol processing chips through a first interface,
the interface adaptation unit connected with the at least two protocol processing chips and connected with the uplink physical interface chip through a second interface, configured to support a bi-directional transmission of communication contents between the at least two protocol processing chips and the second interface,
the bandwidth of at least one of the first interface and the second interface is configured to a pre-defined bandwidth.

11. The DSL subscriber board according to claim 10, wherein the first interface comprises one interface and the second interface comprises two or more interfaces.

12. The DSL subscriber board according to claim 10, wherein, the first interface comprises two or more interfaces and the second interface comprises at least one interface.

13. The DSL subscriber board according to claim 10, wherein, at least one of the first interface and the second interface is configured with an increased bandwidth rate.

14. The DSL subscriber board according to claim 10, wherein, at least one of the first interface board and the second board is configured with an increased clock frequency.

* * * * *

UNITED STATES PATENT AND TRADEMARK OFFICE
CERTIFICATE OF CORRECTION

PATENT NO. : 7,599,389 B2  Page 1 of 1
APPLICATION NO. : 11/526389
DATED : October 6, 2009
INVENTOR(S) : Xie et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 506 days.

Signed and Sealed this

Twenty-eighth Day of September, 2010

David J. Kappos
*Director of the United States Patent and Trademark Office*